Jan. 17, 1928.

G. SCHUMACHER 1,656,448

VALVE

Filed Aug. 23, 1926

Inventor
Gerhard Schumacher
By Gabel & Banning Attys

Jan. 17, 1928.

G. SCHUMACHER 1,656,448

VALVE

Filed Aug. 23, 1926

Inventor
Gerhard Schumacher
By Zabel & Banning Attys.

Patented Jan. 17, 1928.

1,656,448

UNITED STATES PATENT OFFICE.

GERHARD SCHUMACHER, OF MILWAUKEE, WISCONSIN, ASSIGNOR TO EMIL M. ROGERT, OF CLEVELAND, OHIO, AND GERHARD SCHUMACHER, OF MILWAUKEE, WISCONSIN, JOINT TRUSTEES.

VALVE.

Application filed August 23, 1926. Serial No. 131,009.

My invention relates to a valve structure adapted to control the mixture of hot and cold water and the direction in which the mixture will be discharged, and has for its purpose the provision of a structure of this character which is compact and easily operated and in which the various parts are readily replaceable.

In providing bath room fixtures at the present time the demand, particularly in apartment houses, is for a control device which may be mounted in the wall of the bath room in such a manner as to be of pleasing appearance but still be efficient in operation. Such a valve structure must be easily taken apart for repairs in order to prevent tearing down of the walls, disturbing of the pipe connections and the resultant delay and expense. A valve structure of this type must also be compact so as to take up as little space as possible and not make an unsightly opening or series of openings in the bath room wall.

My invention is made for the purpose of accomplishing the above mentioned desirable results and still providing a simple and easily accessible control means for the valves.

One object of this invention is to provide a double structure having a single control member for opening one of the valves and closing the other.

Another object of the invention is to provide a double valve structure wherein the various parts of the valves are readily removable and replaceable without disturbing the pipe connections to the valve casing or in any way injuring the walls in which the valve structure is mounted.

A still further object of this invention is to provide means whereby the mixtures of hot and cold water may be varied by single rotary motion of a control member.

An additional object of my invention is to provide a valve unit which is capable of controlling the mixture of hot and cold water, the amount of water available, and the point to which the mixture of water is discharged, and which at the same time occupies a minimum amount of space.

More particularly it is the object of this invention to provide a compact, easily operated valve unit which will permit the user to obtain straight cold water only to the full capacity of the supply pipe, straight hot water only to the full capacity of the supply line or any desired mixture of the two, to control the volume of water flowing whether it is hot, cold or a mixture of the two and in addition to direct the water to either a tub or shower without changing the volume of water or the relative proportions of hot and cold.

Referring now to the accompanying drawings wherein—

Fig. 4 is a fragmentary view of a modification wherein the inlet valves are operated by an arm secured to the operating handle of the main control valve; and Fig. 5 is a detail view of the arm which is secured to the main control valve.

Figure 1:
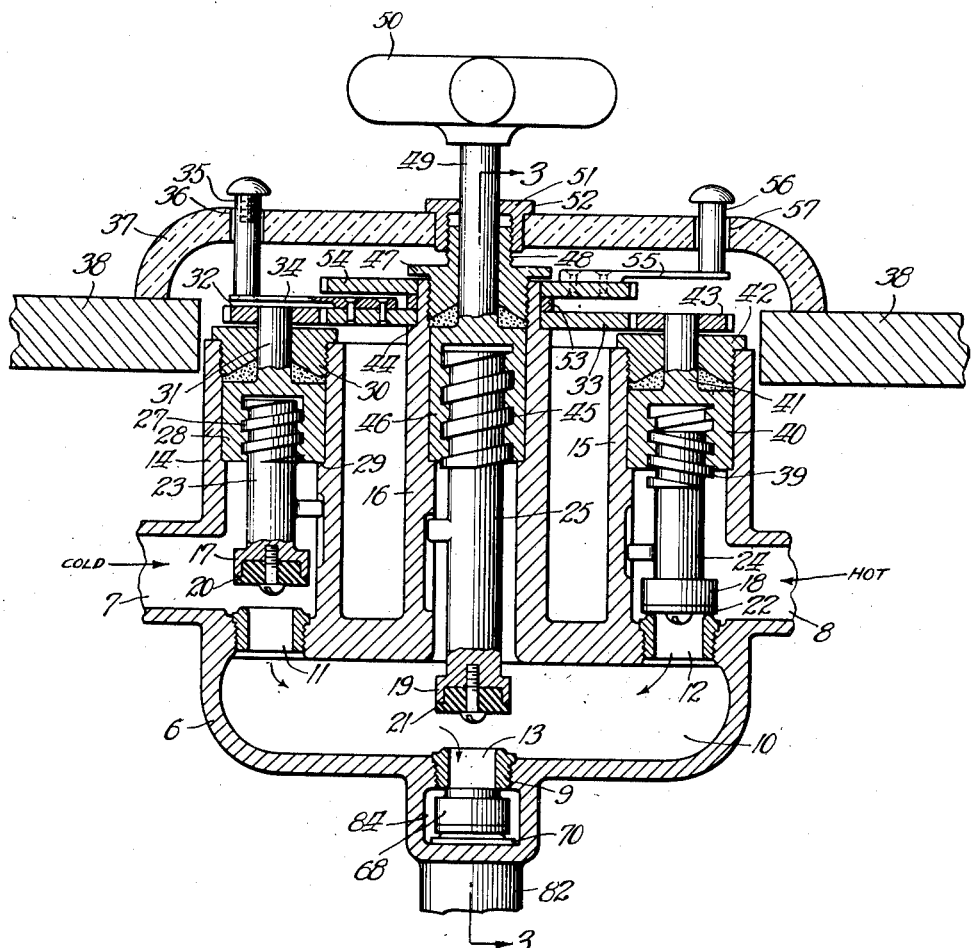
Fig. 1 is a sectional view of my valve unit showing the hot and cold inlet control valves and the operating members.

Referring now to Fig. 1, 6 is a casing having inlet openings 7 and 8 and an outlet at 9 with a mixing chamber 10 connecting said inlets with said outlet. Valve seats 11 and 12 are screw threaded into the chamber between said inlets and said outlet, and valve seat 13 is screw threaded into the outlet in such a manner as to be readily detachable therefrom. Projecting upwardly from the casing 6 are the tubular extensions 14 and 15. These extensions have openings therethrough of sufficient diameter to permit the valve seats 11 and 12 when unscrewed from their casings to be taken out through said openings. A third tubular extension 16 projects between the extensions 14 and 15 in the same direction and slightly therebeyond. This extension also has a bore of sufficient diameter to permit removal of the valve seat 13 therethrough. Co-operating with the valve seats 11, 12 and 13 are the valves 17, 18 and 19 having removable seat engaging members 20, 22 and 21 secured thereto by screws or other suitable securing means.

Extending into the extensions 14, 15 and 16 are the valve stems 23, 24 and 25. These valve stems have projections thereon slidable in slots provided in the tubular extensions so that the valve stems may slide longitudinally of the extensions but are prevented from rotating therein by the engagement of such projections with said slots. Valve stem 23 has screw threads 27 on the outer end thereof, these being right-handed screw threads. Rotatably mounted in the extension 14 is the member 28 having internal screw threads co-operating with the screw threads 27 on the valve stem 23 whereby rotation of the member 28 will cause endwise movement of the stem 23 in a well known manner. Member 28 is prevented from moving longitudinally of the extension 14 by shoulders 29 at the lower end thereof and the packing ring 30 screw threaded in the upper end of the extension 14. Extending through the packing ring from the member 28 is a shaft 31 having a gear 32 thereon which is engaged by the gear 33, having the operating arm 34 riveted or otherwise secured thereto. Extending upward from the arm 34 is the handle 35 which extends through a semi-circular slot 36 provided in the porcelain cover plate 37 which rests against the wall 38, which may be the wall of the bath room or other room in which the device is mounted.

Referring now to valve stem 24, this stem has screw threads 39 thereon which are what is known as left-hand screw threads and which engage corresponding internal screw threads on the member 40 which is rotatably mounted in the member 15 in substantially the same way as the member 28 is mounted in the extension 14. Member 40 has the stem 41 extending through the packing ring 42 and carrying the gear 43 at its upper end. This gear 43 engages with the gear 33 at a point substantially diametrically opposite gear 32. Thus it will be seen that upon rotation of the gear 33 by means of the handle 35 both gears 32 and 43 will be rotated in the same direction, but due to the fact that valve stem 23 has right-handed screw threads and valve stem 24 has left-handed screw threads valve 17 will be moved upwardly while valve 18 is moved downwardly, and vice versa. By this structure single rotary movement of the gear 33 is made to turn the cold water on and the hot water off, and by a reversal of this movement the hot water is gradually turned on as the cold water is turned off.

Figure 2:
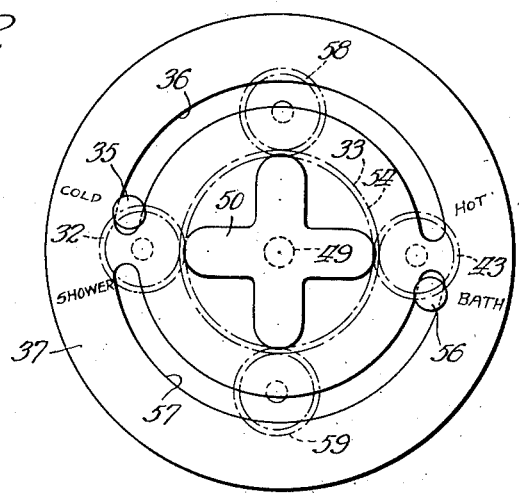
Fig. 2 is a plan view of Fig. 1 showing the arrangement of the valves and operating members.

The gear 33 is rotatably mounted on the extension 16 and supported on a shoulder 44 formed by cutting down the upper end of said extension where it projects beyond the extensions 14 and 15. Within the extension 16 the valve stem 25 has screw threads 45 thereon engaging corresponding screw threads in a member 46 which rotates in the member 16 and is held therein in substantially the same manner as the member 28 is held in member 14. The packing ring 47 which secures member 46 in casing 16 has a reduced externally screw threaded portion 48 extending upwardly therefrom and the stem 49 carrying the operating handle 50 for operating the valve 19 extends upwardly through the member 47. An internally screw threaded member 51 having an opening therethrough for the stem 49 engages the threads of the member 48 and has outwardly extending flanges 52 which engage with the walls of an opening in the member 37 for holding said member in place. Mounted on the reduced portion of the extension 16 is a collar 53, and resting on this collar is a gear 54 having an arm 55 riveted or otherwise secured thereto, which arm has a handle member 56 extending outwardly therefrom through an arcuate slot 57 formed in the porcelain member 37 and lying opposite the slot 36 as shown clearly in Fig. 2.

Figure 3:
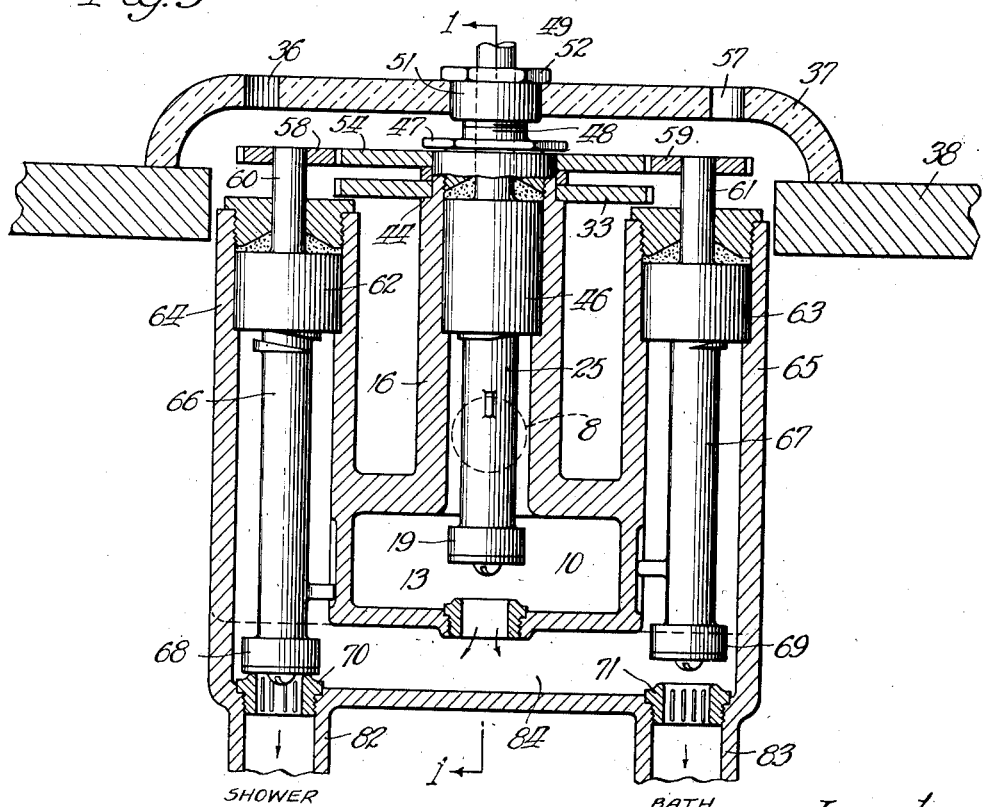
Fig. 3 is a sectional view taken on line 3—3 of Fig. 1 illustrating the control valves for the shower and tub outlets.

Referring now to Fig. 3, the gear 54 is shown as engaging gears 58 and 59 mounted on the upwardly extending stems 60 and 61 of the rotatable members 62 and 63 which are rotatably mounted in the extensions 64 and 65 of the casing 6. Rotatable members 62 and 63 are secured in the members 64 and 65 in substantially the same manner as the members 28 and 40 are secured, and these members 62 and 63 are internally screw threaded, one with a left-hand thread and the other with a right-hand thread. Valve stems 66 and 67 having right-hand and left-hand screw threads on the upper ends thereof engage with the internally screw threaded members 62 and 63. These valve stems 66 and 67 have projections thereon engaging corresponding recesses in the extensions 64 and 65 as clearly shown in Fig. 3, to permit longitudinal movement of said stems in the extensions and still prevent rotation of the stems therein.

Mounted on the lower ends of the valve stems 66 and 67 are valve heads 68 and 69 respectively, which engage valve seats 70 and 71 screw threaded in the outlet openings 82 and 83, one of which may lead to the shower and the other of which may lead to the bath tub. The openings in the extensions 64 and 65 are of sufficient diameter to permit removal of the valve seats 70 and 71 outwardly therethrough when they are disengaged from their respective outlets. A chamber 84 connects the outlets 82 and 83 above the valve seats 70 and 71 and the outlet 9 from chamber 10 opens into this chamber. Thus it will be seen that water flowing through either the hot or the cold inlet into chamber 10 will, when the valve 19 is open, pass into the chamber 84 and from there be directed through either the outlet 82 or outlet 83 as desired by the opening or closing of valves 68 and 69.

The valves 68 and 69 are operated from the gear 54 through the gears 58 and 59, rotatable members 62 and 63 and stems 66 and 67 in substantially the same manner as valves 17 and 18 are operated from gear 33.

Referring now to the modification shown in Figs. 4 and 5, a collar 90 is mounted on the stem 49 and has arms 91 and 92 extending therefrom substantially 90 degrees apart. The collar 90 is secured to the stem 49 by means of a set screw 93 or other suitable means and turns therewith. These arms are of sufficient length to extend outwardly and engage the handle 35 carried by the arm 34 on the gear 33 so that upon rotation of the member 49 the gear 33 may be caused to turn therewith and in this manner the valves 17 and 18 may be operated by the handle 50 which controls the valve seat 13. The provision of the two arms 91 and 92 allows a partial opening of the valve 19 before the arm 91 engages the handle 35, thus enabling the user to obtain straight cold water if desired. Further movement of the handle 49 will cause the arm 91 to move the gear 33 by means of the handle 35 and arm 34 and in this manner gradually close the cold water opening and open the hot water valve, and by continuing this movement all of the cold water can be shut off and the hot water valve opened wide by means of the handle 50; then upon closing the valve 19 by rotating the handle 15 in the opposite direction the arm 92 is brought into engagement with the handle 35 and moves the same back to open the cold water valve and close the hot water as the valve 19 is closed.

The advantage of this modification lies in the fact that the user of the shower or tub in opening the valve 19 always gets cold water at the beginning and is in no danger of being scalded by some other person having left the hot water valve open and the cold water valve shut, since with this device the closing of the outlet valve 19 also sets the other valves with the cold water open and the hot water shut off.

While I have thus described one form my invention may take, I wish it to be clearly understood that this form is for illustrating purposes only, and that I intend to avail myself of all such modifications as would occur to persons skilled in this art and as fall within the scope of the appended claims.

Having thus described my invention, what I claim and desire to secure by Letters Patent is:—

1. A device of the character described having in combination, a casing provided with a pair of inlet openings and an outlet opening, inlet valve seats between each of said inlet openings and said outlet and a valve seat in said outlet opening, tubular extensions projecting from a side of said casing and communicating with the interior thereof, said extensions each aligning with one of said valve seats, a valve for each seat having a stem slidable in the corresponding tubular extension, a member rotatable in each extension and motion translating means connecting each member with the corresponding valve stem for moving said valves toward and away from their respective seats, an actuating member rotatable on the tubular extension aligning with said outlet valve seat engaging the rotatable member operating the inlet valves, and a second actuating member for said outlet valve.

2. A device of the character described having in combination, a casing provided with a pair of inlet openings and an outlet opening, inlet valve seats between each of said inlet openings and said outlet and a valve seat in said outlet opening, valves cooperating with said seats and having stems projecting in the same direction therefrom, tubular extensions on said casing housing said stems, an actuating member rotatable about the axis of the outlet valve stem, means connecting said member with one inlet valve stem for causing the inlet valve thereon to move away from its seat upon rotation of said member in one direction, means connecting said member with the other inlet valve stem for causing the inlet valve thereon to move toward its seat during the same rotation of said member and means for operating said outlet valve extending through said actuating member.

3. A device of the character described having in combination, a casing provided with a pair of inlet openings and an outlet opening, inlet valve seats between each of said inlet openings and said outlet and a valve seat in said outlet opening, valves cooperating with said seats and having stems projecting in the same direction therefrom, tubular extensions on said casing housing said stems, an actuating member rotatable about the axis of the outlet valve stem, means connecting said member with one inlet valve stem for causing the inlet valve thereon to move away from its seat upon rotation of said member in one direction, means connecting said member with the other inlet valve stem for causing the inlet valve thereon to move toward its seat during the same rotation of said member and means for operating said outlet valve extending through said actuating member, said valves, stems and valve seats being removable from said casing through said extensions.

4. A device of the character described having in combination, a casing provided with a pair of inlet openings and an outlet opening, inlet valve seats between each of said inlet openings and said outlet and a valve seat in said outlet opening, valves cooperating with said seats and having stems projecting in the same direction therefrom, said outlet valve and stem lying between said inlet valves and stems, an actuating member, means connecting said actuating member with the stems of the inlet valves whereby movement of said actuating member in one direction causes one inlet valve to open and the other to close and an operating member connected to the outlet valve stem for opening and closing said outlet valve.

5. A device of the character described having in combination, a casing provided with a pair of inlet openings and an outlet opening, inlet valve seats between each of said inlet openings and said outlet and a valve seat in said outlet opening, valves cooperating with said seats and having stems projecting in the same direction therefrom, an actuating member, means connecting said actuating member with the stems of the inlet valves whereby movement of said actuating member in one direction causes one inlet valve to open and the other to close and an operating member connected to the outlet valve stem for opening and closing said outlet valve, said operating and actuating members being rotatable about a common axis.

6. A device of the character described having in combination a casing provided with an inlet opening and a pair of spaced outlet openings, valve seats in said openings, valves cooperating with said seats and having stems projecting in the same direction therefrom, an actuating member, means connecting said actuating member with the stems of the outlet controlling valves, whereby movement of said member in one direction causes one outlet valve to open and the other to close, and an operating member having means extending through said actuating member and connected to the inlet controlling valve for opening and closing the inlet.

7. A device of the character described having in combination a casing provided with an inlet opening and a pair of spaced outlet openings, valve seats in said openings, valves cooperating with said seats and having stems projecting in the same direction therefrom, an actuating member, means connecting said actuating member with the stems of the outlet controlling valves, whereby movement of said member in one direction causes one outlet valve to open and the other to close, and an operating member having means extending through said actuating member and connected to the inlet controlling valve for opening and closing the inlet, said operating and actuating members being rotatable about a common axis.

8. A device of the character described having in combination a casing provided with an inlet opening and a pair of spaced outlet openings, valve seats in said openings, valves cooperating with said seats and having stems projecting in the same direction therefrom, tubular extensions on said casing housing said stems, an actuating member rotatable about the axis of the inlet valve stem, means connecting said member with the outlet valve stems whereby one of said valves is caused to move toward its seat and the other away from its seat upon rotation of said member in one direction and means for operating said inlet valve extending through said actuating member.

9. A device of the character described having in combination a casing provided with an inlet opening and a pair of spaced outlet openings, valve seats in said openings, valves cooperating with said seats and having stems projecting in the same direction therefrom, tubular extensions on said casing housing said stems, an actuating member rotatable about the axis of the inlet valve stem, means connecting said member with the outlet valve stems whereby one of said valves is caused to move toward its seat and the other away from its seat upon rotation of said member in one direction and means for operating said inlet valve extending through said actuating member, said valves, stems, and valve seats being removable from said casing through said extensions.

10. A device of the character described having in combination a casing provided with an inlet opening and a pair of spaced outlet openings, valve seats in said openings, valves cooperating with said seats and having stems projecting in the same direction therefrom, tubular extensions on said casing housing said stems, an actuating member rotatably mounted on the tubular extension housing said inlet valve stem, means connecting said member with the stems of said outlet valves whereby one of said valves is moved toward its seat and the other outlet valve is moved away from its seat upon rotation of said member in one direction, and means connected to said inlet valve stem for operating the inlet valve.

11. A device of the character described comprising in combination a casing having a pair of chambers and a passage connecting said chambers, said casing being provided with spaced outlet openings leading from one of said chambers and spaced inlet openings into the other chamber, valve seats in said openings, valves cooperating with said seats and having stems projecting in the same direction therefrom, outlet and inlet valve actuating members, means connecting said outlet actuating member with the stems of the outlet controlling valves for opening one outlet and closing the other by a single movement of said member, means connecting the inlet actuating member with the stems of the inlet controlling valves for opening one inlet and closing the other by a single movement of said member, and means for closing the passage between the two chambers.

12. A device of the character described comprising in combination a casing having a pair of chambers and a passage connecting said chambers, said casing being provided with spaced outlet openings leading from one of said chambers and spaced inlet openings into the other chamber, valve seats in said openings, valves cooperating with said seats and having stems projecting in the same direction therefrom, rotatable outlet and inlet valve actuating members, means connecting said outlet actuating member with the stems of the outlet controlling valves for opening one outlet and closing the other by a single movement of said member, means connecting the inlet actuating member with the stems of the inlet controlling valves for opening one inlet and closing the other by a single movement of said member, said actuating members being rotatable about the same axis.

13. A fluid supply device comprising a casing having a pair of inlet openings and a pair of outlet openings and a passage-way connecting both of said outlets with both of said inlets, valve seats in said casing between said inlets and said passage-way, said seats facing in the same direction, tubular extensions formed on said casing projecting away from said seats in the direction in which they face, valves for said seats having stems slidably and non-rotatably supported in said extensions, valves controlling said outlets, an actuating member, and motion translating devices rotatably mounted in said extensions and connecting said stems with said member, said motion translating means, stems, and their respective valves being removable from said casing through said extensions.

In witness whereof, I hereunto subscribe my name this 18th day of August, A. D. 1926.

GERHARD SCHUMACHER.